US 6,729,679 B1

(12) United States Patent
Malott

(10) Patent No.: US 6,729,679 B1
(45) Date of Patent: May 4, 2004

(54) RECREATIONAL VEHICLE SLIDE-OUT AWNING WITH INTERMEDIATE SUPPORT

(75) Inventor: Dale G. Malott, Middlebury, IN (US)

(73) Assignee: Dometic Corporation, Elkhart, IN (US)

( * ) Notice: Subject to any disclaimer, the term of this patent is extended or adjusted under 35 U.S.C. 154(b) by 0 days.

(21) Appl. No.: 10/287,128

(22) Filed: Nov. 4, 2002

(51) Int. Cl.⁷ .............................................. B60R 15/00
(52) U.S. Cl. ..................... 296/175; 242/595.1; 160/67; 296/171
(58) Field of Search ................................ 296/175, 163, 296/171, 26.13, 136; 160/67, 68, 71, 22, 66, 70, 80, 79; 135/88.12, 88.1, 903, 88.11, 90, 88.01; 52/67, 79.5; 49/341; 242/595.1; 248/273

(56) References Cited

U.S. PATENT DOCUMENTS

| | | | |
|---|---|---|---|
| 827,483 A | | 7/1906 | Voorhees |
| 1,377,784 A | * | 5/1921 | Nodland ................... 242/595.1 |
| 2,220,311 A | * | 11/1940 | Anton ..................... 242/595.1 |
| 2,326,642 A | * | 8/1943 | Heiser ..................... 242/595.1 |
| 2,890,853 A | * | 6/1959 | D'Azzo ....................... 248/273 |
| 2,948,288 A | * | 8/1960 | Nelson ...................... 135/88.1 |
| 3,722,571 A | * | 3/1973 | Knight et al. ................. 160/68 |
| 3,834,400 A | * | 9/1974 | Sattler ..................... 135/88.12 |
| 3,851,848 A | | 12/1974 | Wiele |
| 3,918,511 A | * | 11/1975 | Upton, Jr. ................... 160/67 |
| 3,980,121 A | * | 9/1976 | McKee ........................ 160/71 |
| 4,077,419 A | * | 3/1978 | Lux ........................... 160/68 |
| 4,117,876 A | | 10/1978 | Bennett |
| 4,188,964 A | * | 2/1980 | Greer ......................... 160/67 |
| 4,211,374 A | * | 7/1980 | Salvino ................... 242/595.1 |
| 4,269,531 A | * | 5/1981 | Brolin ......................... 160/22 |
| 4,634,172 A | | 1/1987 | Duda |
| 4,640,332 A | * | 2/1987 | Turner ......................... 160/71 |
| 4,727,897 A | * | 3/1988 | Watts ........................ 135/88.1 |
| 4,801,119 A | * | 1/1989 | Pelletier .................. 135/88.12 |
| 5,044,416 A | | 9/1991 | Murray |
| 5,171,056 A | * | 12/1992 | Faludy et al. ................ 296/175 |
| 5,174,352 A | | 12/1992 | Murray et al. |
| 5,280,687 A | * | 1/1994 | Boiteau ...................... 296/171 |
| 5,285,837 A | * | 2/1994 | Pozzi .......................... 160/66 |
| 5,365,989 A | * | 11/1994 | Eger et al. ................... 160/70 |
| 5,423,506 A | * | 6/1995 | Spoon ........................ 296/163 |
| 5,558,145 A | * | 9/1996 | Baka .......................... 160/67 |
| 5,560,412 A | * | 10/1996 | Murray ........................ 160/67 |
| 5,601,267 A | * | 2/1997 | Caine ......................... 160/67 |
| 5,636,675 A | * | 6/1997 | Baka et al. ................... 160/67 |
| 5,752,536 A | * | 5/1998 | Becker ....................... 296/171 |
| 5,819,830 A | * | 10/1998 | Verelst ....................... 160/66 |
| 5,860,440 A | * | 1/1999 | Murray et al. .............. 296/175 |
| 5,944,085 A | * | 8/1999 | Malott ......................... 160/67 |
| 6,123,136 A | * | 9/2000 | Williams ..................... 160/67 |
| RE37,567 E | * | 3/2002 | Murray ....................... 296/175 |
| 2002/0092552 A1 | * | 7/2002 | Jones ...................... 135/88.01 |

* cited by examiner

Primary Examiner—Kiran Patel
(74) Attorney, Agent, or Firm—Pearne & Gordon LLP

(57) ABSTRACT

An intermediate support for a retractable roll awning. The support is positioned between two end brackets and provides additional support. The support includes a two support surfaces for supporting the roll awning in two directions. Alternatively, the support may comprise a single curved support surface. The support surface or surfaces include an arrangement for reducing friction.

11 Claims, 5 Drawing Sheets

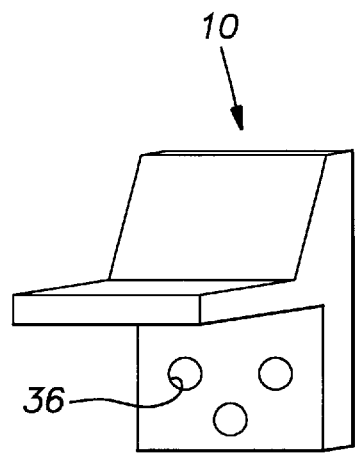
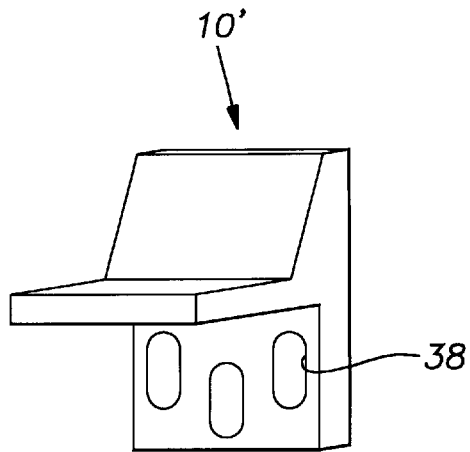
FIG. 5         FIG. 6
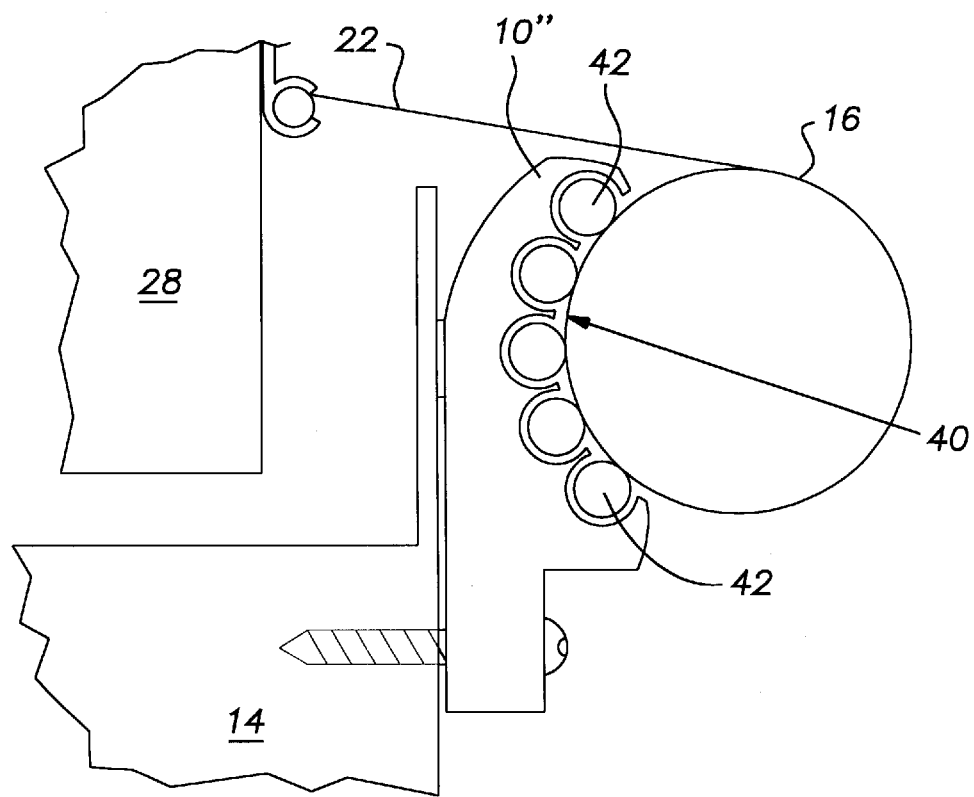
FIG. 7

RECREATIONAL VEHICLE SLIDE-OUT AWNING WITH INTERMEDIATE SUPPORT

BACKGROUND OF THE INVENTION

This invention relates generally to retractable awnings, and more particularly, to an intermediate support for a retractable awning for use with recreation vehicles having retractable slide-out portions.

Typical vehicles which must be transported over the roads, such as travel trailers and motor homes, are restricted in width to about eight feet. Any vehicle having a greater width usually requires a wide load permit. This width limitation severely limits the interior lay-out of the vehicle. Therefore, some recreational vehicles have been provided with retractable structures generally referred to as a "slide-outs" or slide-out rooms have been provided in many recreational vehicles. Such slide-outs are generally rectangular, and in some instances, extend lengthwise of the vehicle for substantial distance. Further, because of their size, such slide-outs are generally moved between the retracted and extended position by powered actuators. An example of a slide-out is illustrated in the U.S. Pat. No. 4,500,132.

It is customary to form the roof of the slide-out as a flat surface extending parallel to the roof of the vehicle. Such slide-out roofs, which are flat and extend horizontally, tend to collect leaves, snow, dirt and other debris. Although seals have been provided for slide-outs to resist the movement of such debris into the vehicle interior when the slide-out is retracted, difficulty is often encountered because such debris is carried past the seal and enters the interior of the vehicle when the slide-out is retracted for road travel.

In order to prevent the collection of debris on the roof of a slide-out, a retractable awning system has been provided in which a retractable awning was mounted so as to cover a substantial portion of the roof of the slide-out when the slide-out was extended. The intention of such awning was to cause any rain, snow, leaves or other debris to collect on the surface of the awning, and not on the roof, per se. The awning is structured so that as the slide-out is retracted, the awning rolls up on a roll journaled at the outer surface of the slide-out and drops the debris harmlessly on the ground. The roll is supported and journaled by a pair of brackets located at either end of the roll. Such a retractable awning is illustrated and described in the U.S. Pat. No. 5,280,687.

For especially long rolls, since they are only supported at their ends, the middle section of the roll may tend to sag or bow. The disadvantage of such sagging is an untidy appearance, as well as diminished shedding of water and debris.

SUMMARY OF THE INVENTION

The present invention provides a recreational vehicle comprising a side wall, a slide-out room extendable from the side wall of the vehicle, a roll awning journaled to the slide-out room by a pair of brackets at ends of the roll awning, the roll awning comprising a fabric having one edge secured to the side wall. The recreational vehicle further comprises an intermediate support attached to the slide-out room and comprising a supporting surface that supports the roll awning at a location between the pair of brackets as the slide-out room is being extended from the side wall.

BRIEF DESCRIPTION OF SEVERAL VIEWS OF THE DRAWING

FIG. 5 is a perspective view showing the intermediate support of FIG. 1;

FIG. 6 is a perspective view showing an intermediate support for a slide-out room of a vehicle according to a first alternate embodiment of the present invention; and FIG. 7 is a side view showing an intermediate support for a slide-out room of a vehicle according to a second alternate embodiment of the present invention.

DETAILED DESCRIPTION OF THE INVENTION

Figure 1:
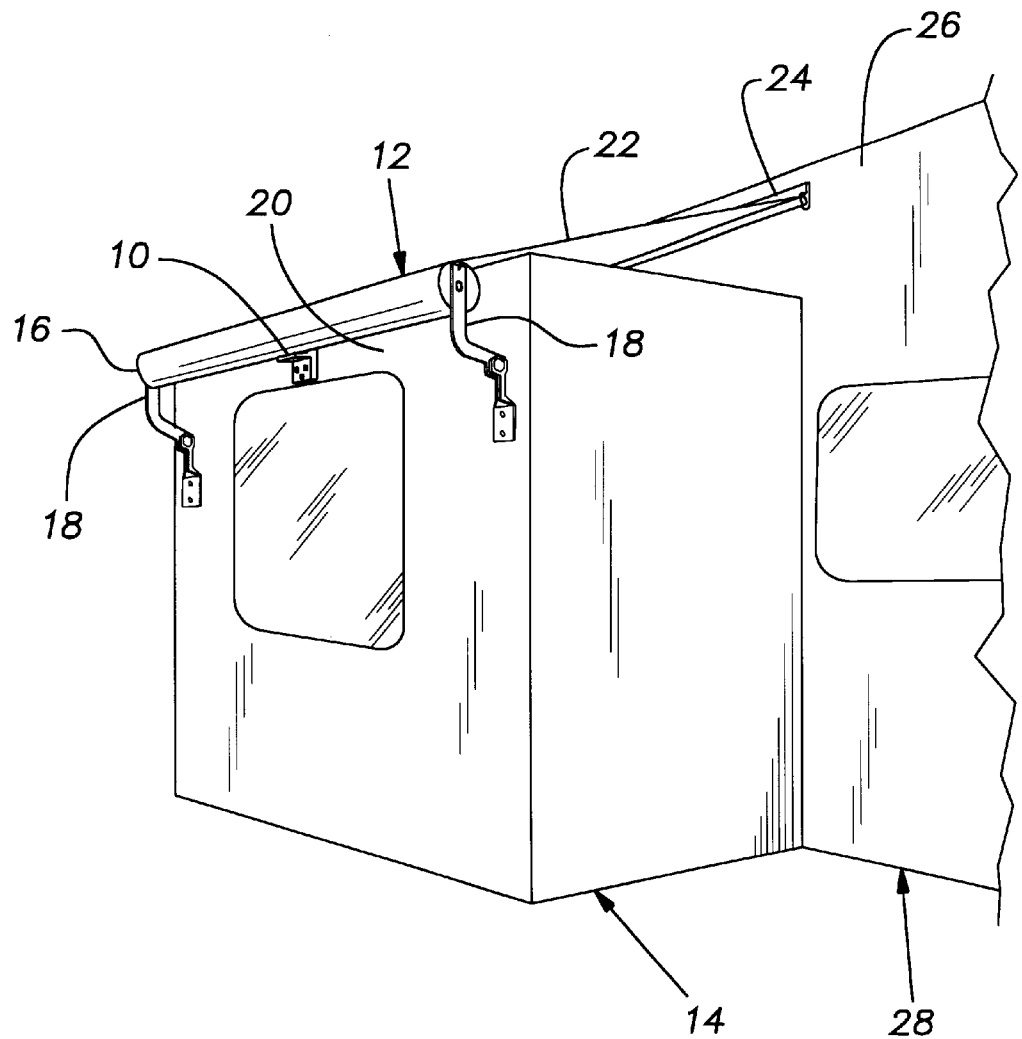
FIG. 1 is a perspective view showing an intermediate support for a slide-out room of a vehicle according to the present invention.
Figure 2:
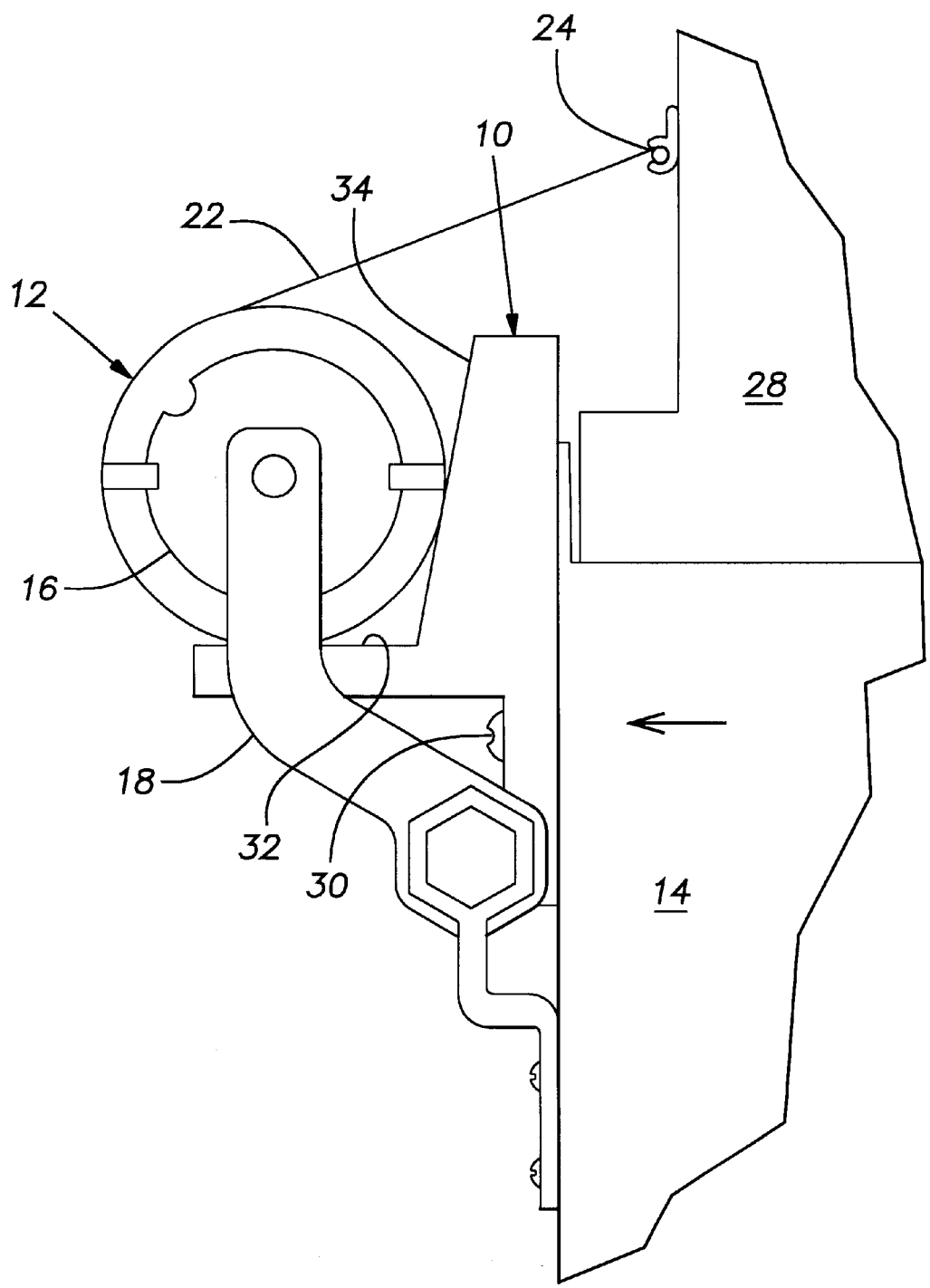
FIG. 2 is a side view of the support of FIG. 1.
Figure 3:
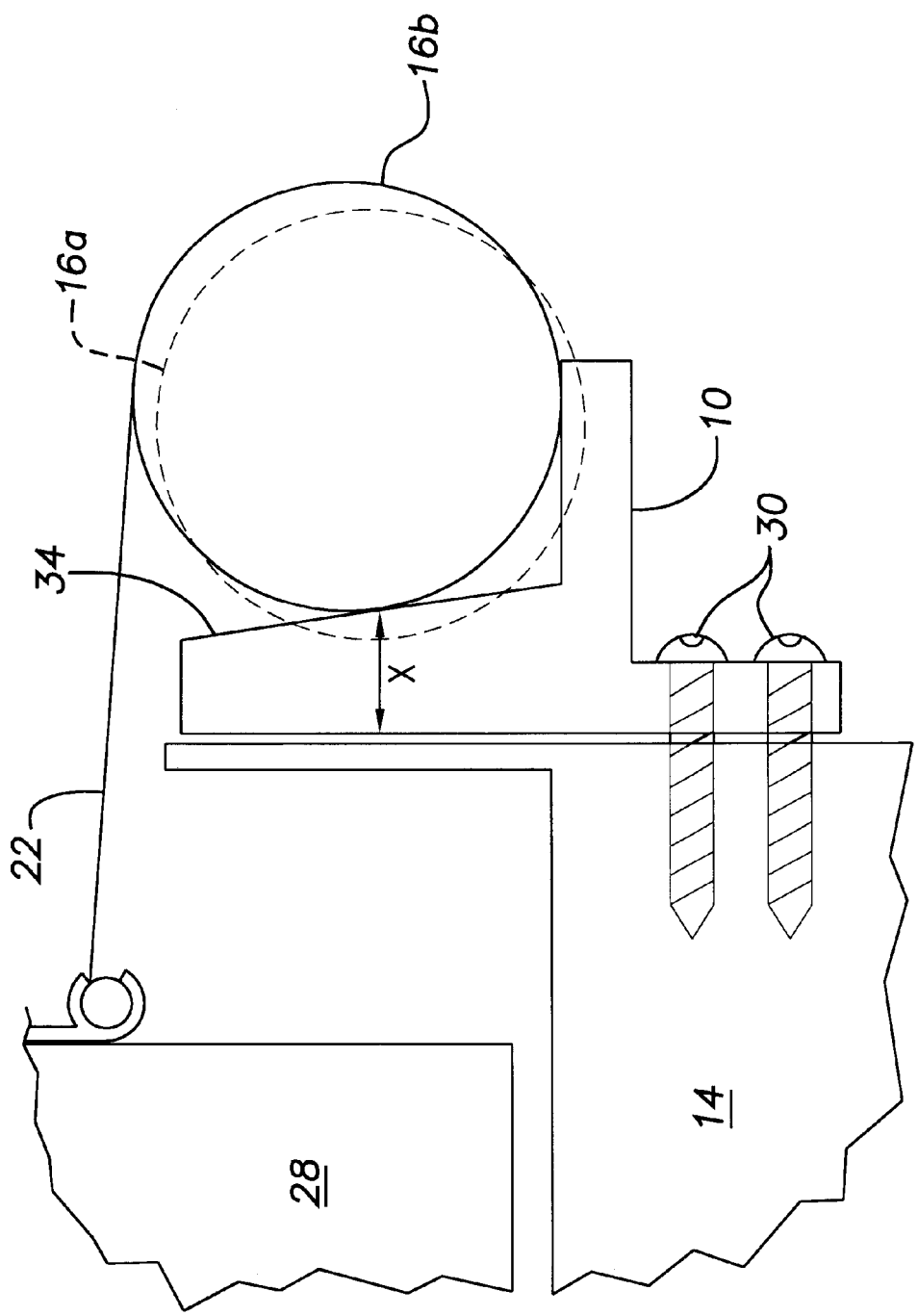
FIG. 3 is a schematic sectional view of an intermediate support according to the present invention.

Referring to FIGS. 1–3, the present invention provides an intermediate support 10 for a slide-out awning or cover assembly 12 used for a vehicle slide-out room 14. The awning assembly 12 comprises an awning roll 16 journaled to a pair of brackets 18 acting as end supports that are attached a wall 20 of the slide-out room 14. An awning 22 comprising a sheet of fabric is wound around the roll 16 and secured at one edge 24 to a stationary wall 26 of the vehicle 28. As the slide-out 14 is extended from the wall 26 of a vehicle 28, the rolled awning 22 unwinds while the edge 24 of the awning 22 remains secured to the stationary vehicle wall 26.

The support 10 of the present invention attaches to the wall 20 of the slide-out room 14 and supports the awning assembly 12 at a location intermediate to the brackets 18. The support 10 is secured to the wall 20 by one or more screws 30.

As best shown in FIGS. 2 and 3, the support 10 is generally L-shaped having a relatively flat bottom surface 32 and a sloped back or rear surface 34, both of which contact the awning assembly 12 proximate to its midpoint as it unrolls or rolls up on the support 10. The support 10 prevents bowing or sagging of the roll 16. One or more of the support surfaces 32, 34 may have a friction-reducing coating, such as polytetrafluoroethylene (PTFE), to facilitate rolling up or unwinding of the awning 22. Alternatively, the support 10 itself may be made from a low friction material.

As shown in FIG. 3, the support 10 both lifts the roll 16 and spaces it from the wall 20. The position of the middle of the roll 16 is schematically shown in broken lines 16a as sagging without the support 10 and in solid lines 16b as supported. The distance, x, from the wall 20 is set to hold the roll 16 straight or slightly bowed away from the wall 20 at the midpoint of its length. The height of the support 10 is set so the roll 16 is straight or slightly bowed up at the midpoint of its length. Since the roll 16 decreases in diameter as the awning 22 is unwound, the bowed support prevents the roll 16 from sagging due to this decrease in diameter.

Figure 4:
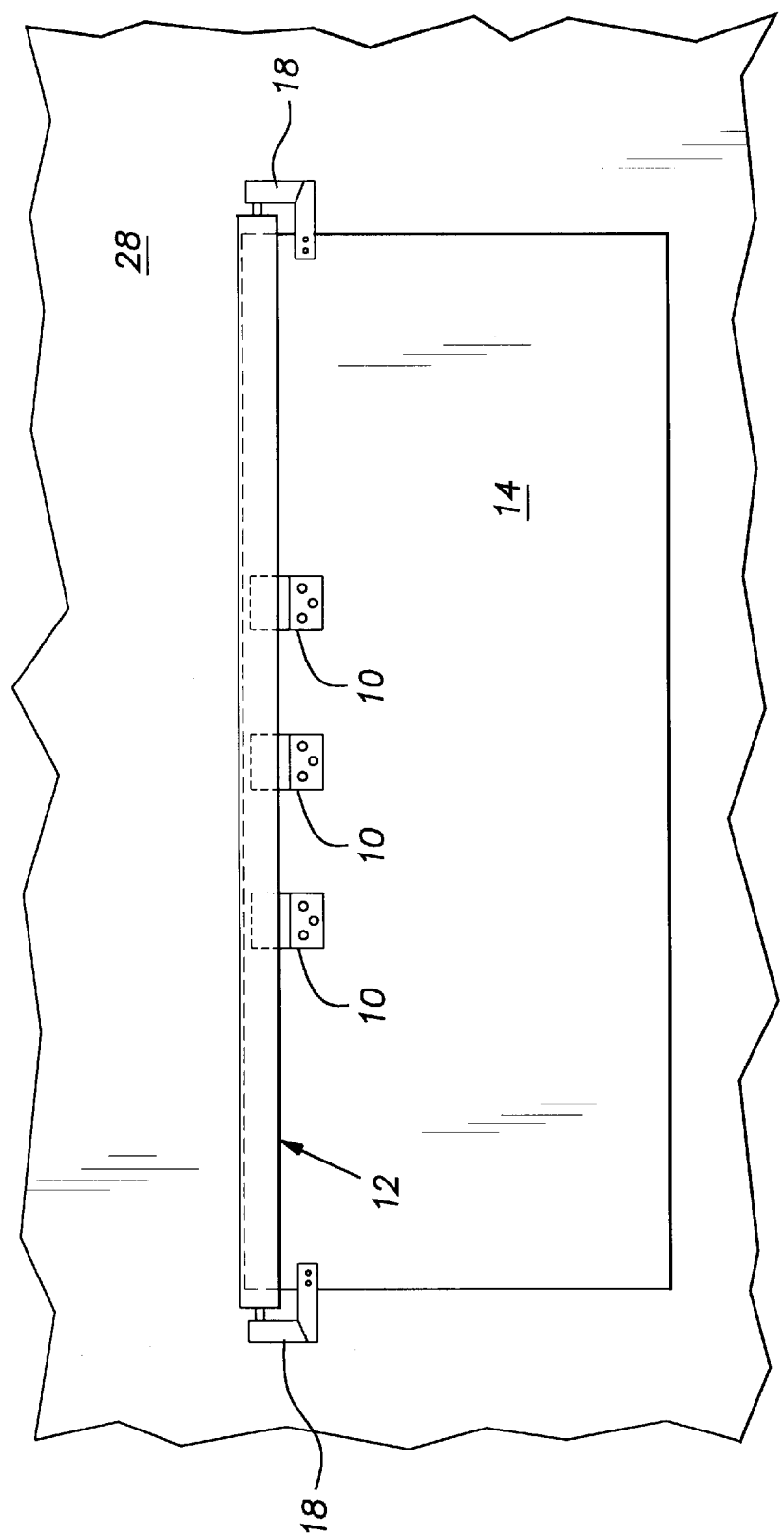
FIG. 4 is a front elevation showing supports according to an alternative embodiment of the invention.

Alternatively, as shown in FIG. 4, multiple supports 10 can be used, spaced apart along the length of the roll 16. The number of supports 10 required to adequately support a particular roll depends upon the roll's length and girth.

As best shown in FIG. 5, three holes 36 are provided on the support 10 to accommodate the screws 30 for securing the support 10 to the wall 20. As a first alternative embodiment, shown in FIG. 6, elongated holes 38 can be provided to allow for vertical adjustment of the support 10'. Further, it should be appreciated that any number of holes can be provided. Further, other means of fastening the support 10, 10' to the wall 20 can be used, such as riveting, welding or gluing.

As a second alternative embodiment, shown in FIG. 7, a curved support 10" has a single curved support surface 40, as a substitute for the two support surfaces 32, 34 of the support 10, 10' of FIGS. 1–6. The shape of the surface 40 provides the horizontal and vertical support of the previous embodiment and additionally provides support in the negative vertical direction to prevent the awning roll 16 from being lifted under the tension of being deployed. Further, roller or ball bearings 42, as schematically shown, are provided to reduce the friction between the roll 16 and the surface 40. Although five bearings 42 are shown, any number of rollers can be used according to the present invention. Further, the bearings 42 could be replaced by other means of reducing friction, such as balls bearings or a low friction surface such as PTFE, as in the previous embodiments. Moreover, it should be appreciated that the bearings 42 of the embodiment of FIG. 7 could be adapted for use in the embodiments of FIGS. 1–6.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A recreational vehicle comprising:
    a side wall;
    a slide-out room extendable from the side wall of the vehicle;
    a roll awning journaled to the slide-out room by a pair of brackets at ends of the roll awning, the roll awning comprising a fabric having one edge secured to the side wall; and
    an intermediate support attached to the slide-out room and comprising a supporting surface that supports the roll awning at a location between the pair of brackets as the slide-out room is being extended from the side wall;
    wherein the supporting surface lies within a single plane.

2. The recreational vehicle of claim 1, wherein the supporting surface comprises a friction-reducing arrangement.

3. The recreational vehicle of claim 2, wherein the friction-reducing arrangement comprises PTFE.

4. The recreational vehicle of claim 2, wherein the friction-reducing arrangement comprises bearings.

5. The recreational vehicle of claim 4, wherein the bearings comprise roller bearings.

6. The recreational vehicle of claim 4, wherein the bearings comprise ball bearings.

7. The recreational vehicle of claim 1, further comprising a second intermediate support.

8. The recreational vehicle of claim 1, wherein the intermediate support is attached to the slide-out room so that it is vertically adjustable.

9. A recreational vehicle comprising:
    a side wall;
    a slide-out room extendable from the side wall of the vehicle;
    a roll awning journaled to the slide-out room by a pair of brackets at ends of the roll awning, the roll awning comprising a fabric having one edge secured to the side wall; and
    an intermediate support attached to the slide-out room and comprising a first supporting surface positioned at a first angle and a second supporting surface positioned at a second angle different from the first angle, the intermediate support supporting the roll awning at a location between the pair of brackets as the slide-out room is being extended from the side wall.

10. The recreational vehicle of claim 9, wherein the roll awning is bowed outward by the second supporting surface.

11. The recreational vehicle comprising:
    a side wall;
    a slide-out room extendable from the side wall of the vehicle;
    a roll awning journaled to the slide-out room by a pair of brackets at ends of the roll awning, the roll awning comprising a fabric having one edge secured to the side wall; and
    an intermediate support attached to the slide-out room and comprising a supporting surface that supports the roll awning at a location between the pair of brackets as the slide-out room is being extended from the side wall;
    wherein the roll awning is bowed upward by the supporting surface when an awning material is fully wound onto the roll awning and the bowing of the awning is reduced as the awning material is unwound.

* * * * *